United States Patent
Diac et al.

(10) Patent No.: US 10,353,798 B1
(45) Date of Patent: Jul. 16, 2019

(54) RAPID DEVELOPMENT ENVIRONMENT

(71) Applicant: Amazon Technologies, Inc., Seattle, WA (US)

(72) Inventors: Mihai Diac, Iasi (RO); Andreas Resios, Iasi (RO); Cristian Balcanu, Iasi (RO)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/641,899

(22) Filed: Jul. 5, 2017

(51) Int. Cl.
  *G06F 11/36* (2006.01)
  *G06F 9/50* (2006.01)
  *G06F 8/30* (2018.01)

(52) U.S. Cl.
  CPC .......... *G06F 11/3612* (2013.01); *G06F 8/30* (2013.01); *G06F 9/50* (2013.01)

(58) Field of Classification Search
  None
  See application file for complete search history.

(56) References Cited

U.S. PATENT DOCUMENTS

| | | | |
|---|---|---|---|
| 2004/0133445 A1* | 7/2004 | Rajan | G06F 8/20 717/108 |
| 2009/0106256 A1* | 4/2009 | Safari | G06F 11/1433 |
| 2012/0254825 A1* | 10/2012 | Sharma | G06F 8/34 717/101 |
| 2013/0152047 A1* | 6/2013 | Moorthi | G06F 11/368 717/124 |
| 2014/0143752 A1* | 5/2014 | Rumer | G06F 8/30 717/106 |
| 2015/0309922 A1* | 10/2015 | Mansour | G06F 11/3648 714/38.1 |
| 2017/0220334 A1* | 8/2017 | Hart | G06F 8/65 |
| 2017/0257432 A1* | 9/2017 | Fu | G06F 9/5072 |
| 2017/0344462 A1* | 11/2017 | Vecera | G06F 11/3668 |

(Continued)

OTHER PUBLICATIONS

Runnable: Catch bugs earlier; www.runnable.com; pp. 1-7; printed Jul. 5, 2017.

(Continued)

*Primary Examiner* — Shih-Wei Kraft
(74) *Attorney, Agent, or Firm* — Lee & Hayes, P.C.

(57) ABSTRACT

A developer-specific rapid development environment includes an instance of an application stack that is personal to a software developer. The personal application stack instance is a complete or partial replica of a production application stack executing in a service provider network. The personal application stack includes one or more software containers executing on the developer's development host (e.g. the developer's laptop, desktop, or virtual machine). An application under development can be deployed to and executed in the personal application stack instance. An instance of a workflow, which is also personal to the developer, can be instantiated for automating the execution of steps of a development workflow using the personal application stack instance such as, for example, building and testing the application, provisioning resources for use by the application, deploying the application and changes to the application to the personal application stack instance, and performing tests on the application.

20 Claims, 9 Drawing Sheets

(56) References Cited

U.S. PATENT DOCUMENTS

2018/0083840 A1* 3/2018 Poonen .................. H04L 41/12

OTHER PUBLICATIONS

Platform—Continuous Deployment Cloud Hosting Paas; www.platform.sh; 10 pages; copyright 2017.
Spolsky, Joel; Introducing HyperDev; Fog Creek Software; May 31, 2016; https://www.joelonsoftware.com/2016/05/31/introducing-hyperdev/; 10 pages.
Bitrise—Mobile Continuous Integration and Delivery; BitRise.com; https://www.bitrise.com/io/; 5 pages; copyright 2014-2017.

* cited by examiner

RAPID DEVELOPMENT ENVIRONMENT

BACKGROUND

Software developers commonly perform many iterations on software changes prior to deploying the changes to a production environment. For example, a developer might iteratively create a change to the source code of an application, build the application, perform tests on the application, deploy the application to a test environment, and perform tests on the application in the test environment. This process can be extremely time consuming and inefficient, particularly when developing applications that execute in service oriented architecture environments. As a result, computing resources, such as processor cycles, memory, and mass storage, can be used inefficiently. This might also result in the inefficient use of other types of resources, such as power.

The disclosure made herein is presented with respect to these and other considerations.

DETAILED DESCRIPTION

Figure 1:
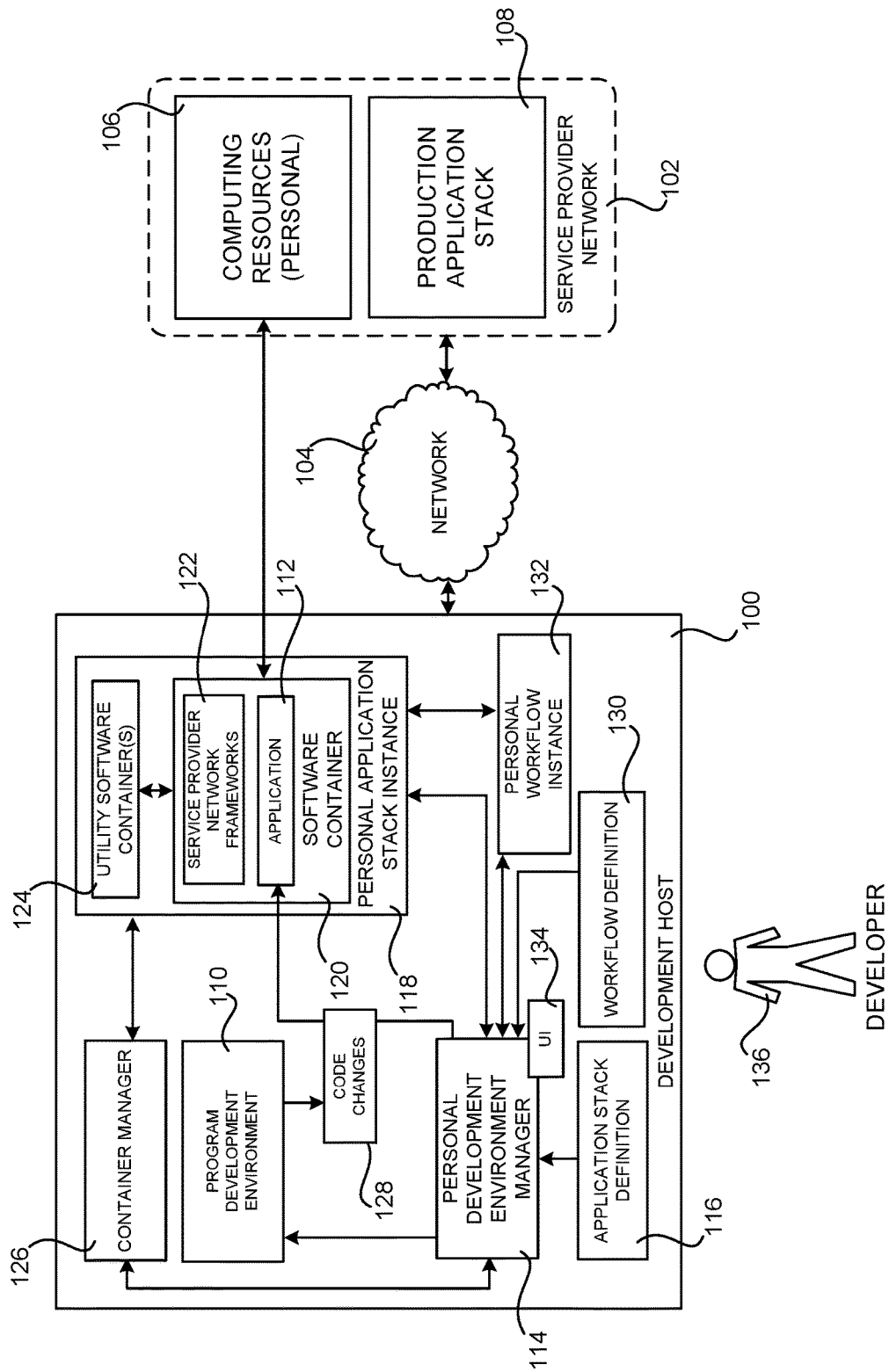
FIG. 1 is a system architecture diagram showing aspects of the configuration and operation of a development host configured to provide a rapid development environment, according to one embodiment.

The following detailed description is directed to technologies for providing a developer-specific rapid development environment. Using the disclosed technologies, software developers can iterate much more quickly on code changes. Consequently, the software development lifecycle can be completed more efficiently, thereby resulting in savings in the utilization of various types of computing resources such as, but not limited to, processor cycles, memory usage, and mass storage usage. Additionally, savings in power consumption can also be realized as a result of the more efficient use of computing resources during application development. The disclosed technologies can also provide additional technical benefits not specifically identified herein.

In order to provide the functionality disclosed herein, a developer-specific rapid development environment is configured on a developer's development host (e.g. the developer's laptop or desktop) that includes an instance of an application stack that is personal to the developer (i.e. created specifically for use by a particular developer). The personal application stack instance is a complete or partial replica of a production application stack executing in a service oriented architecture environment, such as a service provider network.

A personal application stack instance includes one or more software containers executing on the development host in one embodiment. A personal application stack instance can also include other software containers for executing components for providing network services or other types of functionality upon which the application is dependent in other embodiments.

An application under development can be deployed to and executed in a personal application stack instance. An application executing in a personal application stack instance can also utilize computing resources provided by other components executing in the personal application stack instance along with computing resources provided by a service provider network.

In some embodiments, the developer-specific rapid development environment also includes an instance of a workflow, which is also personal to the developer. Such a workflow instance can be instantiated for automating the performance of steps of a development workflow using a personal application stack instance associated with the same developer.

Steps of a development workflow can include, but are not limited to, building and testing the application prior to deployment, provisioning resources for use by the application, deploying the application and changes to the application to a personal application stack instance, and performing integration tests on the application executing in the personal application stack instance. Additional details regarding the various components and processes described briefly above for providing a rapid development environment will be presented below with regard to FIGS. 1-9.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the embodiments described herein can be practiced in distributed computing environments, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which might be referred to herein as a "FIG." or "FIGS.").

FIG. 1 is a system architecture diagram showing aspects of the configuration and operation of a development host 100 configured to provide a rapid development environment, according to one embodiment. As shown in FIG. 1, a software developer 136 can utilize an appropriate development host 100 to execute a program development environment 110. The development host 100 is a hardware computing device (e.g. a laptop or desktop computer) such as that described below with regard to FIG. 9 in some embodiments. In other embodiments, the development host 100 is a virtual machine instance ("VM") executing in a service provider network 102 (discussed in detail below).

The program development environment 110 is an environment that allows a developer 136 to create, compile, execute, and test software programs, such as the application 112. For example, in one illustrative embodiment disclosed herein, the program development environment 110 is the ECLIPSE integrated development environment ("IDE") from the ECLIPSE FOUNDATION. It should be appreciated, however, that other IDEs and other types of program development environments 110 from other vendors might also be utilized with the mechanisms disclosed herein.

In one embodiment, the application 112 is an application that is designed to execute within or in conjunction with the server provider network 102. The development host 100 might connect to a service provider network 102 through an appropriate network 104, such as the Internet. As discussed in greater detail below, the service provider network 102 is a distributed network through which customers and/or other users (e.g. the developer 136) can utilize computing resources (which might be referred to herein as "resources" or a "resource"), such as VM instances, data storage resources, and/or other types of computing resources, on a permanent or as-needed basis.

Each type or configuration of a computing resource can be available from the service provider network 102 in different sizes. For example, the service provider network 102 can offer physical hosts, VM instances or other types of data processing resources that are available for purchase and use that have many different configurations of processor capabilities, main memory, disk storage, and operating system. The service provider network 102 can also offer other types of computing resources for purchase and use by users.

For example, the service provider network 102 can offer virtual or hardware devices, database resources and instances, file or block data storage resources, and/or networking resources, such as load balancing resources, domain name service ("DNS") resources, virtual private cloud ("VPC") resources, virtual local area network ("VLAN") resources, and/or other types of hardware and software computing resources or network services on a permanent or as-needed basis. The computing resources can also include, but are not limited to, VM instances and images, security groups, option groups, gateways, option sets, network access control lists ("ACLs"), subnets, storage buckets, network interfaces, snapshots, spot market requests, and storage volumes.

The computing resources described above are provided in one particular implementation by one or more data centers operated by a service provider. As known to those skilled in the art, data centers are facilities utilized to house and operate computer systems and associated components. Data centers also typically include redundant and backup power, communications, cooling, and security systems. The data centers can be located in geographically disparate regions, and can also be connected to various other facilities, such as co-location facilities, and various wide area networks ("WANs"), such as the Internet. Additional details regarding the configuration of a data center for implementing aspects of the functionality disclosed herein will be provided below with regard to FIGS. 7 and 8.

The computing resources described briefly above can also be provisioned and de-provisioned as-needed in a manual or automated fashion. For example, the service provider network 102 can be configured to instantiate a new instance of a computing resource, such as a VM instance, in response to a request or in response to an increase in demand for a network service or other condition. Other types of computing resources can also be provisioned and de-provisioned in a similar manner. Network services in the service provider network 102 can also provide functionality for automatically scaling and/or de-scaling resources based upon demand for the computing resources and/or other factors.

As discussed briefly above, the service provider network 102 can also be configured to provide various types of network services for use internally and by customers. For example, and without limitation, the service provider network 102 can provide an on-demand computing service for providing VM instances on-demand, a data storage service for storing data, a cryptography service, a database service, a notification service, an authentication service, a policy management service, and, potentially, other types of network-accessible services. These and other services and their associated computing resources can be utilized together to implement various types of network-based applications in the service provider network 102. Additional details regarding one implementation of the service provider network 102 will be discussed below with regard to FIGS. 7 and 8.

As also discussed briefly above, software developers 136 commonly perform many iterations on code changes 128 to an application 112 prior to deploying the changes to a production environment, such as within service provider network 102. For example, a developer 136 might iteratively create a change 128 to the source code of an application 112, build the application in the program development environment 110, perform tests on the application, deploy the application to a test environment (e.g. in the service provider network 120), and perform tests on the application in the test environment.

The iterative process described above can be extremely time consuming and inefficient, particularly when developing applications that execute in service oriented architecture environments, such as the service provider network 102. As a result, computing resources, such as processor cycles, memory, and mass storage, can be used inefficiently. This might also result in the inefficient use of other types of resources, such as power. The technologies disclosed herein address these, and potentially other, considerations.

In order to address the considerations set forth above, and potentially others, a developer-specific rapid development environment is configured on a developer's development host 100 (e.g. the developer's laptop or desktop) that includes an instance 118 of an application stack (which might be referred to herein as a "personal application stack instance" or an "application stack instance") that is "personal" to the developer 136 (i.e. created specifically for use by a particular developer 136 on a development host 100 associated with the developer 136). The personal application stack instance 118 is a complete or partial replica of a production application stack 108 for the application 112 executing in a service oriented architecture environment, such as the service provider network 102.

It is to be appreciated that an application 112 can be implemented as a group of software components that are configured to work together. The components might include, for example, network services, agents, process-managers, servers (e.g. a web server application), and/or other types of software components. An application stack includes all of the components of an application and any other resources required for the application to function correctly (e.g. accounts, databases, and other types of computing resources). A production application stack 108 can be implemented in the service provider network 102 that is configured to received "production" (i.e. live) network traffic. The production application stack 108 is not intended for use by a developer 136 to test changes 128 to an application 112.

A personal application stack is a full or partial replica of the production application stack 108 that executes on the development host 100 rather than in the service provider network 102. As will be described in greater detail below, a personal application stack instance 118 can be instantiated on the development host 100 and utilized for iterating on code changes 128 to an application 112 in a rapid manner prior to deploying the code changes 128 to the production application stack 108.

The developer-specific rapid development environment disclosed herein can also include an instance of a software development workflow (which might be referred to herein as a "personal workflow instance 132" or a "workflow instance 132"), which is also personal to the developer 136. Such a workflow instance 132 can be instantiated for automating the performance of steps of a software development workflow using a personal application stack instance 118 associated with the same developer 136.

Steps of a development workflow can include, but are not limited to, building and testing an application 112 prior to deployment, provisioning resources (e.g. the computing resources 106) for use by the application 112 in the service provider network 102, deploying the application 112 and changes 128 to the application 112 to a personal application stack instance 118, starting execution of the application stack instance 118, performing unit and integration tests (or other types of tests) on the application 112 prior to or after deployment to the personal application stack instance 118, de-provisioning resources (e.g. the computing resources 106) for use by the application 112 in the service provider network 102, stopping the execution of the personal application stack instance 118, and initiating a code review for the changes 128 to the application 112 to be initiated. Other steps can be defined in other embodiments. Additionally, the order in which the steps are performed can also be specified by the developer 136.

A personal development environment manager 114 (which might be referred to herein as the "environment manager 114") provides functionality for creating and managing the operation of personal stack instances 118 and personal workflow instances 132 in one embodiment. In order to provide this functionality, the environment manager 114 receives an application stack definition 116 in one embodiment.

An application stack definition 116 comprises data describing how a personal application stack is to be instantiated. For example, and without limitation, the application stack definition 116 can include data identifying the various component of the application 112 that are to be included in an instance 118 of a personal application stack. The application stack definition 116 can also include data identifying other components upon which the application 112 is dependent for execution. The application stack definition 116 can be shared with other users (e.g. members of a software development team) in order to instantiate application stack instances that are personal to the other users.

For instance, other network services (which can be implemented in utility software containers 124 in a personal application stack) and computing resources 106 in the service provider network 102 might be identified. Configuration parameters for enabling the various components of an application stack to communicate with one another can also be specified in the application stack definition. A personal application stack instance 118 is an instance of a personal application stack defined by an application stack definition 116.

The environment manager 114 also receives a workflow definition 130 in one embodiment. The workflow definition 130 includes data defining the steps of a software development workflow that are utilized to iterate on code changes 128 individually. The workflow definition 130 can refer to an associated application stack definition 116. A personal workflow instance 132 is an instance of a workflow defined by a workflow definition 130. The workflow definition 130 can be shared with other users (e.g. members of a software development team) in order to instantiate personal workflow instances 132 that are personal to the other users.

A personal workflow instance 132 can perform various types of functions. For example, and without limitation, a personal workflow instance 132 can control the automation of a software development process before code review, can model code changes 128 at the stack level rather than the application level, can instantiate the associated personal application stack instance 118, trigger integration and end-to-end tests against a personal application stack instance 118, and manage changes 128 forward through defined steps. The steps performed by a personal workflow instance 132 can be pre-defined and/or defined by the developer 136.

A personal workflow instance 132 can be created and started when the developer 136 commits code in a local repository, at predefined intervals, or when other changes 128 are received (e.g. from other developers on a development team). A change 128 will move through the steps of the personal workflow instance 132 when a previous step completes successfully (e.g. when a static code check succeeds, the code is build; when the build succeeds, unit tests begin to execute, etc.). As the steps of the personal workflow instance 132 execute, the developer 136 will have visibility into the progress of individual steps. This is provided through a user interface ("UP") 134 (which will be described in detail below) in one embodiment. The steps of one illustrative development workflow that can be implemented by a personal workflow instance 132 are discussed below with regard to FIG. 4.

In one embodiment, a personal application stack instance 118 is implemented as one or more software containers 120 executing on the development host 100. A software container 120 is a lightweight, stand-alone, executable package of software that includes everything needed to run it: code, runtime, system tools, system libraries, settings. Software containers 120 isolate software from its surroundings. One example of a software container is a DOCKER container from DOCKER, INC. Other software containers from other vendors can be utilized in other embodiments. As shown in FIG. 1, the application 112 can be deployed to a software container 120. Other components, such as frameworks 122 for communicating with and performing other functions with respect to the service provider network 102 can also be included in the software container 120 for use by the application 112.

As shown in FIG. 1, a personal application stack instance 118 can also include other software containers (which might be referred to herein as "utility software containers 124") for executing components for providing network services or other types of functionality upon which the application 112 is dependent. For example, and without limitation, the utility software containers 124 can include network services for enabling HTTPS communication, providing temporary credentials to the application 112, or simulating authentication and authorization functionality provide by a service in the service provider network 102.

Network requests for these services generated by the application 112 can be routed to the network services executing in the utility software containers 124 rather than to their counterpart services in the service provider network 102. Domain name server ("DNS") spoofing and/or other mechanisms can be utilized to redirect requests from the application 112 to services executing in the software containers 124.

As discussed above, an application 112 under development and changes 128 to the application 112 can be deployed to and executed in a personal application stack instance 118. An application 112 executing in a personal application stack instance 118 can also utilize computing resources provided by other components executing in the personal application stack instance (e.g. network services provided in utility software containers 124) along with computing resources 106 provided by the service provider network 102. A personal workflow instance 132 can define the needed computing resources 106 and include a step for instantiating the computing resources 106 in the service provider network 102. The computing resources 106 are unique, temporary, and "personal" to the developer 136. The computing resources 106 can also be pre-populated with data for use by the application 112 executing in the personal application stack instance 118.

In embodiments where software containers 120 are utilized to implement the personal application stack instance 118, the environment manager 114 can communicate with a container manager 126 to perform various functions with regard to a personal application stack instance 118. For example, and without limitation, the environment manager 114 can utilize functionality provided by the container manager 126 to instantiate a personal application stack instance 118, save a personal application stack instance 118, destroy a personal application stack instance 118, take snapshots of a personal application stack instance 118, and/or to perform other functions with regard to a personal application stack instance 118.

As discussed briefly above, a UI 134 is provided in some embodiments that enables a developer to perform various functions including, but not limited to, creating an application stack definition 116, creating a workflow definition 130, providing commands to a personal workflow instance 132 (e.g. to skip a step) and a personal application stack instance 118, and for presenting feedback to the developer 136 on the execution of the steps of a personal workflow instance 132.

Commands that can be initiated through the UI 134 with respect to a personal application stack instance 118 include, but are not limited to, instantiating a personal application stack instance 118, pushing a change 128 to the personal application stack instance 118, canceling a change 128, creating a snapshot of the personal application stack instance 118, sharing a snapshot with another user, applying a change 128, shutting down the personal stack instance 118, shutting down services executing in the personal application stack instance 118, and performing a health check of the personal application stack instance 118.

Commands that can be initiated through the UI 134 with respect to a personal workflow instance 132 include, but are not limited to, temporarily disabling a step in the workflow, enabling a step in the workflow, and re-running the last change 128 that went through a step in the workflow. Information that can be presented in the UI 134 includes, but is not limited to, logs or other information describing the status of services executing in a personal application instance 118 and the results of a health-check operation. The UI can be implemented as a command line interface ("CLI"), a graphical user interface ("GUI") provided by the personal development environment manager 114, a GUI provided by a plug-in to the program development environment 110, or in another manner in other embodiments.

As described briefly above, the rapid development environment disclosed herein can be utilized with multiple, heterogeneous, applications 112. For example, and without limitation, software containers 120 can be configured in the same personal application stack instance 118 that include different types of applications 112. For instance, different software containers 120 in the same personal application stack instance 118 can include mobile applications, network services, web sites, and/or other types of applications 112. Steps of a personal workflow instance 132 can be performed with respect to the different application types. Multiple personal workflow instances 132 can also be executed against code changes 128 to the different types of applications. In this manner, a developer 136 can test changes 128 to different types of interdependent applications (e.g. a mobile application and its corresponding back-end server) on their development host 100. Additional details regarding the configuration and operation of personal stack instances 118 will be provided below with regard to FIGS. 2 and 3, which show example configurations of several personal stack instances 118.

Figure 2:
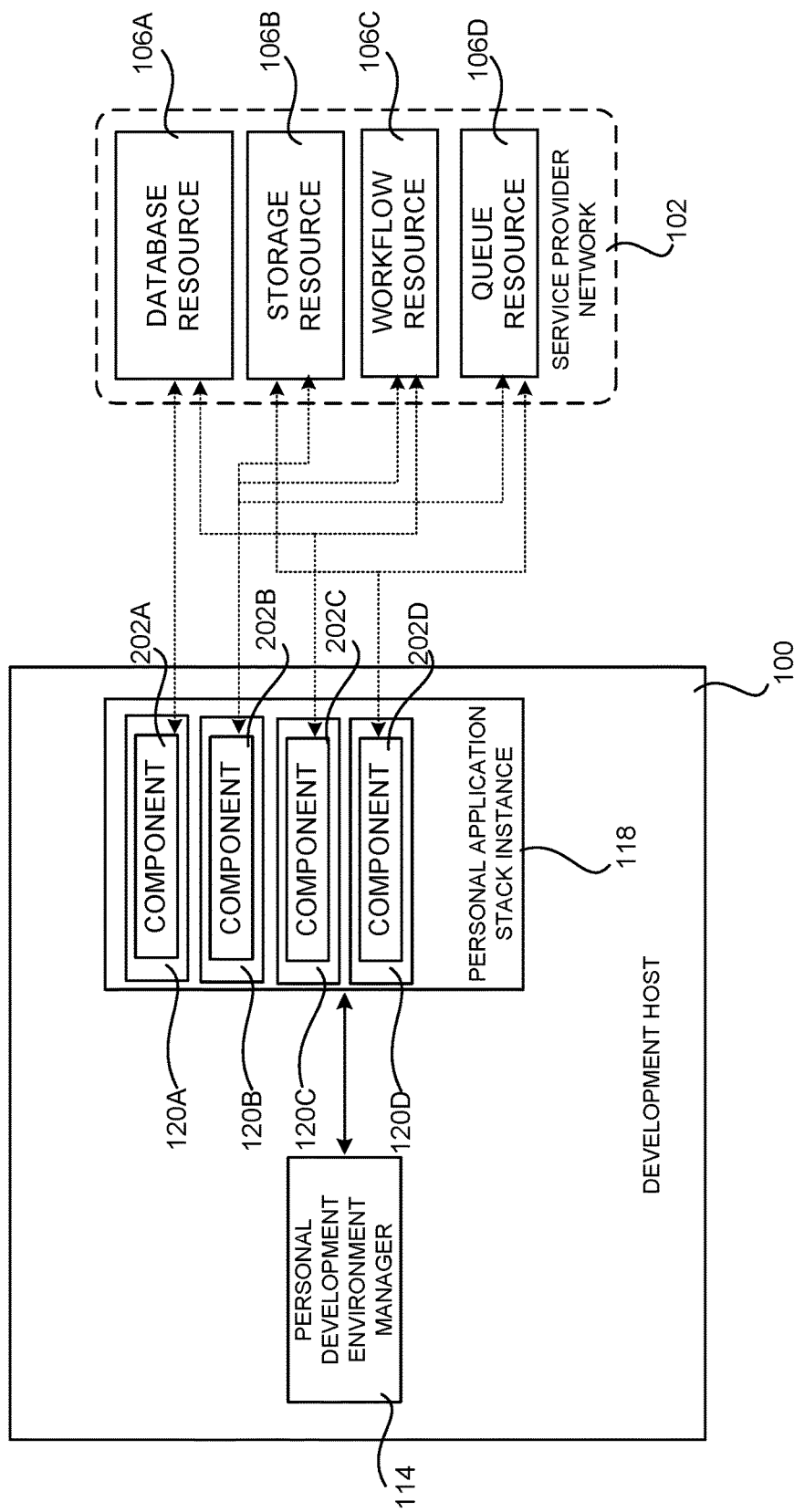
FIG. 2 is a system architecture diagram showing one example personal application stack instance provided within a rapid development environment, according to one embodiment.

FIG. 2 is a system architecture diagram showing one example personal application stack instance 118 provided as a part of a rapid development environment, according to one embodiment. In the example shown in FIG. 2, a personal application stack instance 118 has been created that includes a software container 118 for executing an application 112. In this example, the application 112 includes four components 202A-202D such as, but not limited to, network services. Each of the four components 202A-202D is executed in its own container 120A-120D, respectively.

In the example shown in FIG. 2, the personal workflow instance 132 associated with the personal application stack instance 118 has also instantiated computing resources 106 in the service provider network 102 for use by the components 202A-202D. In particular, the personal workflow instance 132 has caused a database resource 106A, a storage resource 106B, a workflow resource 106C, and a queue resource 106D to be instantiated. As discussed above, one or more of the resources 106 might also be pre-populated with content for use by the components 202A-202D. For example, if one of the components is a web site, web site content might be stored in the storage resources 106B. Other types of content, such as database content, can also be pre-populated in a similar fashion.

Figure 3:
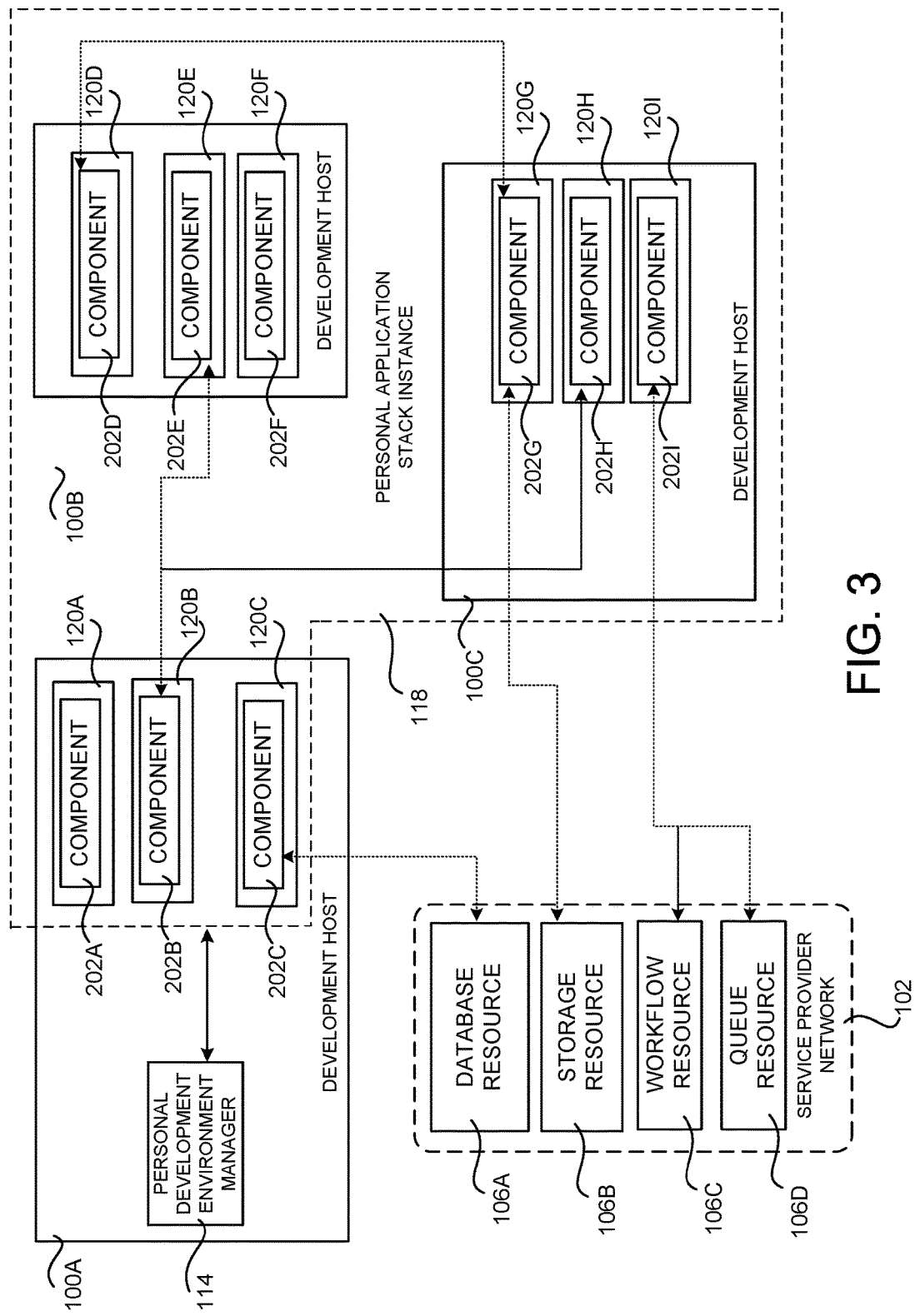
FIG. 3 is a system architecture diagram showing another example personal application stack instance provided within a rapid development environment, according to one embodiment.

FIG. 3 is a system architecture diagram showing another example personal application stack instance 118 provided within a rapid development environment, according to one embodiment. In the example shown in FIG. 3, multiple development hosts 100A-100C are utilized to provide a personal stack instance 118 for an application 112. In particular, a deployment host 100A includes a software containers 120A-120C including components 202A-202C, respectively, a deployment host 100B includes software containers 120D-120F including components 202D-202F, respectively, and a deployment host 100C includes a software containers 120G-120I including components 202G-202I.

As shown in FIG. 3, the components 202A-202I executing in the software containers 120A-120I can communicate with and utilize services provided by one another. Additionally, and as shown in FIG. 3, each of the components 202A-202I can also utilize resources 106A-106D in the service provider network 102. It is to be appreciated that the example personal application stack instances 118 shown in FIGS. 2 and 3 and described above are merely illustrative and that other configurations can be utilized in other embodiments.

Figure 4:
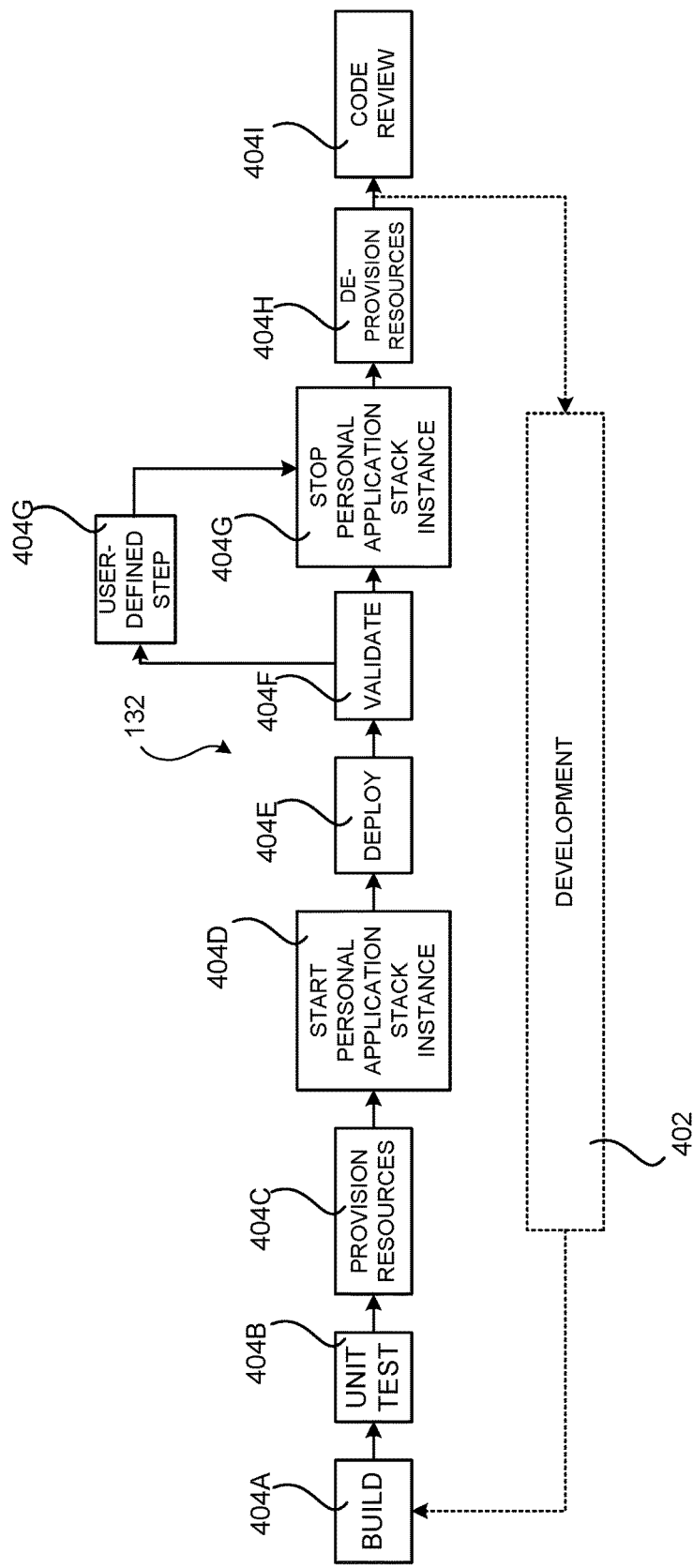
FIG. 4 is a workflow diagram showing aspects of a personal workflow instance for automating the steps of a development workflow using a personal application stack instance, according to one embodiment.

FIG. 4 is a workflow diagram showing aspects of an illustrative personal workflow instance 132 for automating the steps of a development workflow using a personal application stack instance 118, according to one embodiment. As shown in FIG. 4, the personal workflow instance 132 includes steps 404A-404I. The personal workflow instance 132 is initiated following development 402 of changes 128 to an application 112.

When the personal workflow instance 132 is started, the step 404A is triggered, which causes the changes 128 to be built by the program development environment 110. Once the build has completed, the step 404B is initiated, which performs units tests 404B on the built application 112. Once the unit tests have completed, the step 404C is started, which causes resources to be provisioned for use by the application, such as resources 106 in the service provider network 102.

Once the resources 106 have been provisioned, the step 404D is performed. Step 404D starts the personal application stack instance 118 corresponding to the personal workflow instance 132. Once the personal application stack instance 118 has be started, the step 404E is performed in order to deploy the changes 128 to the personal application stack instance 118. Validation and testing (e.g. integration testing) can then be performed at step 404F. Once validation and testing has completed, step 404G can be performed for stopping the personal application stack instance 118. Resources, such as resources 106 in the service provider network 102, can then be de-provisioned at step 404H. As shown in FIG. 4, a user-defined step 404G, can be performed at any point in the workflow.

Once step 404H has been completed, the developer 136 can continue development of the application 112. The workflow described above can then be performed repeatedly until the developer 134 is satisfied with the changes 128. Once the developer 134 is satisfied with the changes 128, the step 404I of the workflow can be performed in order to submit the changes 128 for code review. Following code review, the changes 128 might be deployed to the production application stack 108 in the service provider network 102. It is to be appreciated that the illustrative personal workflow instance 132 shown in FIG. 4 and described above is merely illustrative and that other steps 404 be can be utilized and performed in a different order in other embodiments.

Figure 5:
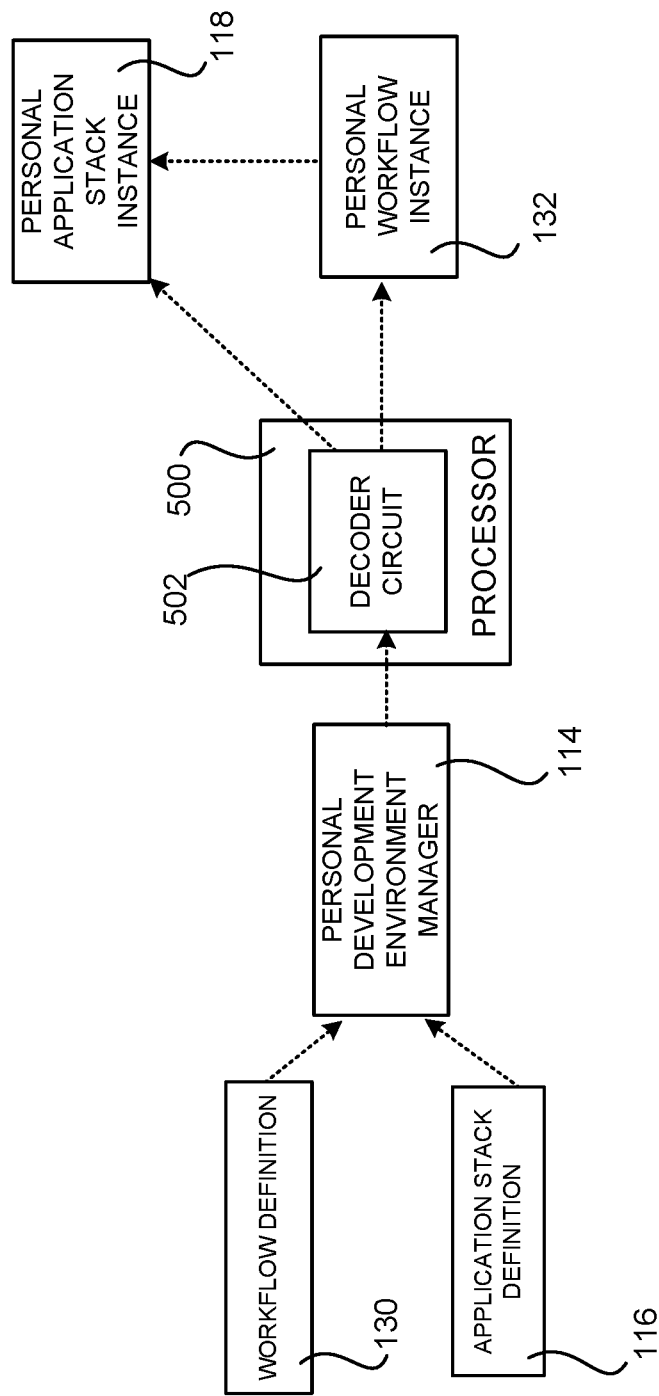
FIG. 5 is a system architecture diagram illustrating aspects of the configuration and operation of a processor configured for providing a rapid development environment, according to one embodiment.

FIG. 5 is a system architecture diagram illustrating aspects of the configuration and operation of a processor 500 configured for providing a rapid development environment, according to one embodiment. As illustrated in FIG. 5, the processor 500 includes a decoder circuit 502 that is configured to decode instructions to provide a rapid development environment in the manner described herein.

The instructions decoded by the decoder circuit can be general purpose instructions or function-specific instructions that receive instructions from other personal development environment manager 114 to create a personal workflow instance 132 and a personal application stack instance 118. As discussed above, the personal development environment manager 114 can receive a workflow definition 130 and an application stack definition 116 for use in creating the personal workflow instance 132 and the personal application stack instance 118, respectively.

When the decoder circuit 502 is configured to decode function-specific instructions, the decoder circuit 502 can also be specific to those instructions in order to decode specific instruction fields included in x86, ARM, MIPS, or other architectures, such as an opcode, one or more data fields (immediate or addresses to data) and the like. Other processor configurations can be utilized to implement the functionality described above in other embodiments. The decoder circuit 502 can create and start the personal workflow instance 132 and the personal application stack instance 118 in the manner described herein.

Figure 6:
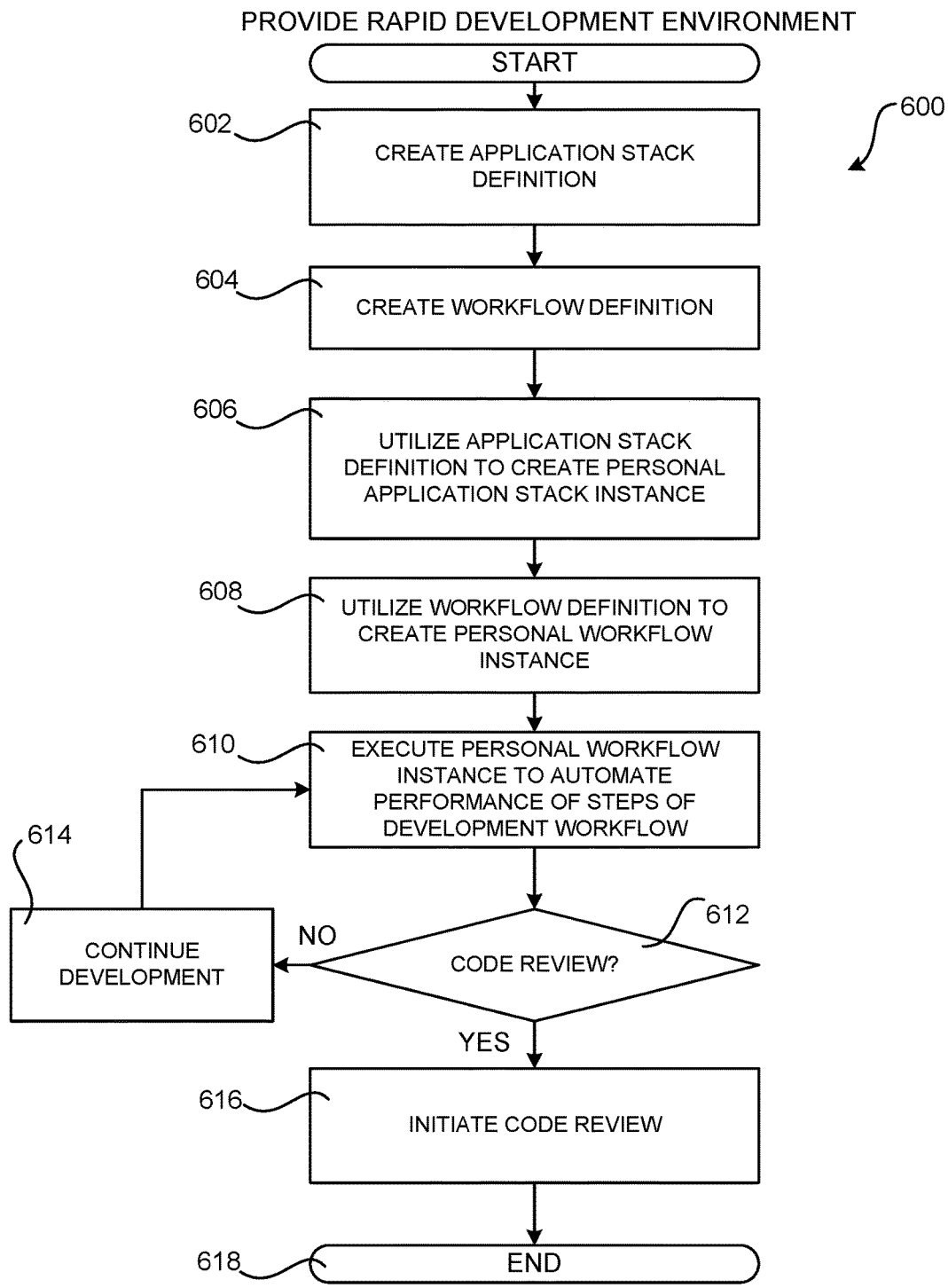
FIG. 6 is a flow diagram showing a routine that illustrates further aspects of the operation of a development host for providing a rapid development environment, according to one embodiment.

FIG. 6 is a flow diagram showing a routine 600 that illustrates further aspects of the operation of a development host 100 for providing a rapid development environment, according to one embodiment. It should be appreciated that the logical operations described herein with respect to FIG. 6, and the other FIGS., can be implemented (1) as a sequence of computer implemented acts or program modules running on a computing system and/or (2) as interconnected machine logic circuits or circuit modules within a processor.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

The routine 600 begins at operation 602, where a developer 136 creates an application stack definition 116. The routine 600 then proceeds to operation 604, where the developer 136 creates a personal workflow definition 130 corresponding to the application stack definition 116.

From operation 604, the routine 600 proceeds from operation 606 to operation 606, where the personal development environment manager 114 utilizes the application stack definition 116 to create a personal application stack instance 118. Similarly, at operation 608, the personal development environment manager 114 utilizes the workflow definition 130 to create a personal workflow instance 132. From operation 608, the routine 600 proceeds to operation 610.

At operation 610, the personal workflow instance 132 created at operation 608 is executed in order to automate the steps of a development workflow, as described above. If, a step exists at the completion of the execution of the personal workflow instance 132 for initiating a code review, the routine 600 proceeds from operation 612 to operation 616, where the code review is initiated. However, if a code review 612 is not to be initiated, the routine 600 proceeds from operation 612 to operation 614, where development of the application 112 and execution of the personal workflow instance 132 can continue in the manner described above. From operation 616, the routine 600 proceeds to operation 618, where it ends.

Figure 7:
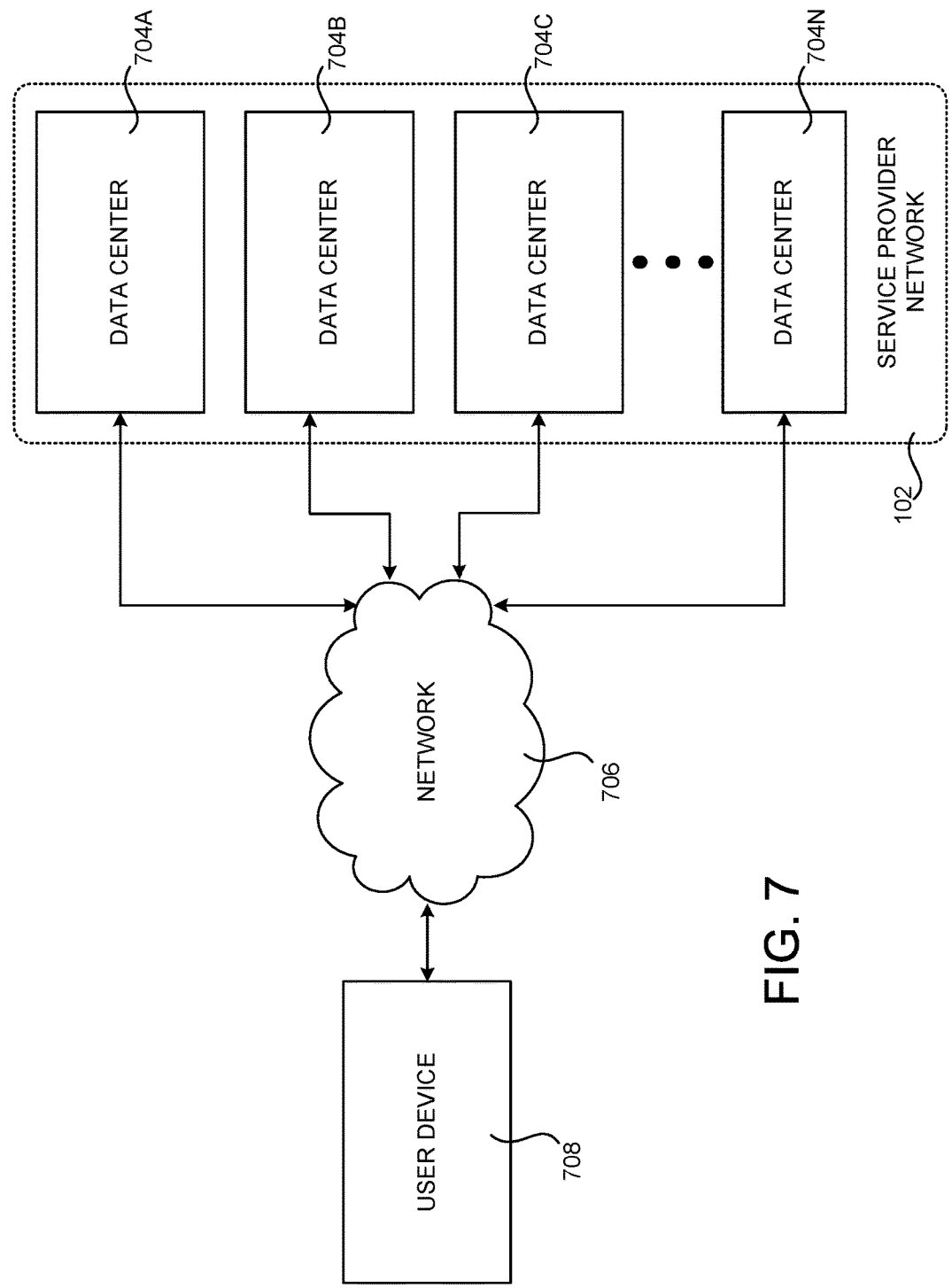
FIG. 7 is a computing system diagram that illustrates a configuration for a service provider network that can be utilized to implement aspects of the technologies disclosed herein.

FIG. 7 is a system and network diagram that shows aspects of a service provider network 702 that can provide computing resources for implementing aspects of the various technologies disclosed herein including, but not limited the production application stack 108 and the computing resources 106, which were described in detail above. The computing resources provided by the service provider network 702 can include various types of computing resources, such as data processing resources, data storage resources, networking resources, data communication resources, network services, and the like.

Each type of computing resource provided by the service provider network 702 can be general-purpose or can be available in a number of specific configurations. For example, data processing resources can be available as physical computers or virtual machine instances in a number of different configurations. The virtual machine instances can be configured to execute applications, including web servers, application servers, media servers, database servers, some or all of the services described herein, and/or other types of programs. Data storage resources can include file storage devices, block storage devices, and the like. The service provider network 702 can also be configured to provide other types of resources 106 and network services.

The computing resources provided by the service provider network 702 are enabled in one implementation by one or more data centers 704A-704N (which might be referred herein singularly as "a data center 704" or in the plural as "the data centers 704"). The data centers 704 are facilities utilized to house and operate computer systems and associated components. The data centers 704 typically include redundant and backup power, communications, cooling, and security systems. The data centers 704 can also be located in geographically disparate locations. One illustrative configuration for a data center 704 that implements aspects of some of the technologies disclosed herein will be described below with regard to FIG. 8.

Users of the service provider network 702, such as a user of the computing device 708 (e.g. the development host 100), can access the various resources 106 provided by the service provider network 702 over a network 706, which can be a wide area communication network ("WAN"), such as the Internet, an intranet or an Internet service provider ("ISP") network or a combination of such networks. For example, and without limitation, a user computing device 708 can be utilized to access the service provider network 702 by way of the network 706. As discussed above, a development host 100 can also be implemented utilizing a VM provided by the service provider network 102 in some embodiments. It should be appreciated that a local-area network ("LAN"), the Internet, or any other networking topology known in the art that connects the data centers 704 to remote computers can also be utilized. It should also be appreciated that combinations of such networks can also be utilized.

Figure 8:
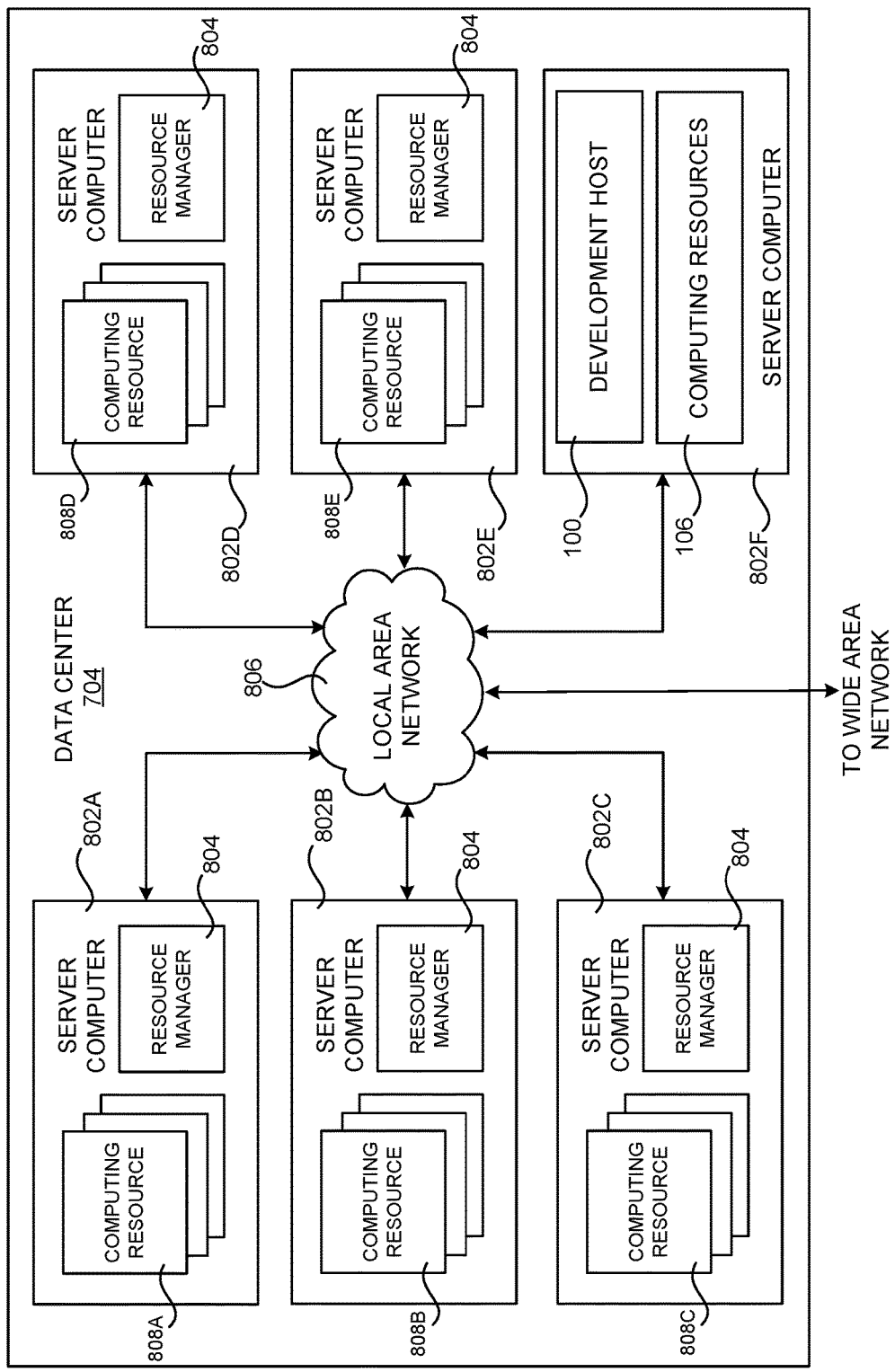
FIG. 8 is a computing system diagram that illustrates aspects of the configuration for a data center that can be utilized to implement aspects of the technologies disclosed herein.

FIG. 8 is a computing system diagram that illustrates one configuration for a data center 704 that can be utilized to implement aspects of the technologies disclosed herein. The example data center 704 shown in FIG. 8 includes several server computers 802A-802F (which might be referred to herein singularly as "a server computer 802" or in the plural as "the server computers 802") for providing computing resources 808A-808E (which can include, but are not limited to, the computing resources 106 described above).

The server computers 802 can be standard tower, rack-mount, or blade server computers configured appropriately for providing the computing resources 808. As mentioned above, the computing resources 808 can be data processing resources such as virtual machine instances or hardware computing systems, data storage resources, database resources, networking resources, and others. Some of the servers 802 can also be configured to execute a resource manager 804 capable of instantiating and/or managing the computing resources 808. In the case of VM instances, for example, the resource manager 804 can be a hypervisor or another type of program configured to enable the execution of multiple virtual machine instances on a single server 802.

The data center 804 shown in FIG. 8 also includes a server computer 802F that can execute some or all of the software components described above. For example, and without limitation, the server computer 802F can be configured to execute software components for implementing the development host 100 as a VM, for providing computing resources 106 for use by a personal application stack instance 118 executing on a personal application stack instance 118, and the related functionality described herein. The server computer 802F can also be configured to execute other components and/or to store data for providing some or all of the functionality described herein. In this regard, it should be appreciated that the software components illustrated in FIG. 8 as executing on the server computer 802F can execute on many other physical or virtual servers in the data centers 804 in various embodiments.

In the example data center 804 shown in FIG. 8, an appropriate LAN 806 is also utilized to interconnect the server computers 802A-802F. The LAN 806 is also connected to the network 706 illustrated in FIG. 7. It should be appreciated that the configuration and network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 704A-704N, between each of the server computers 802A-802F in each data center 704 and, potentially, between computing resources 808 in each of the data centers 804. It should also be appreciated that the configuration of the data center 704 described with reference to FIG. 8 is merely illustrative and that other implementations can be utilized.

Figure 9:
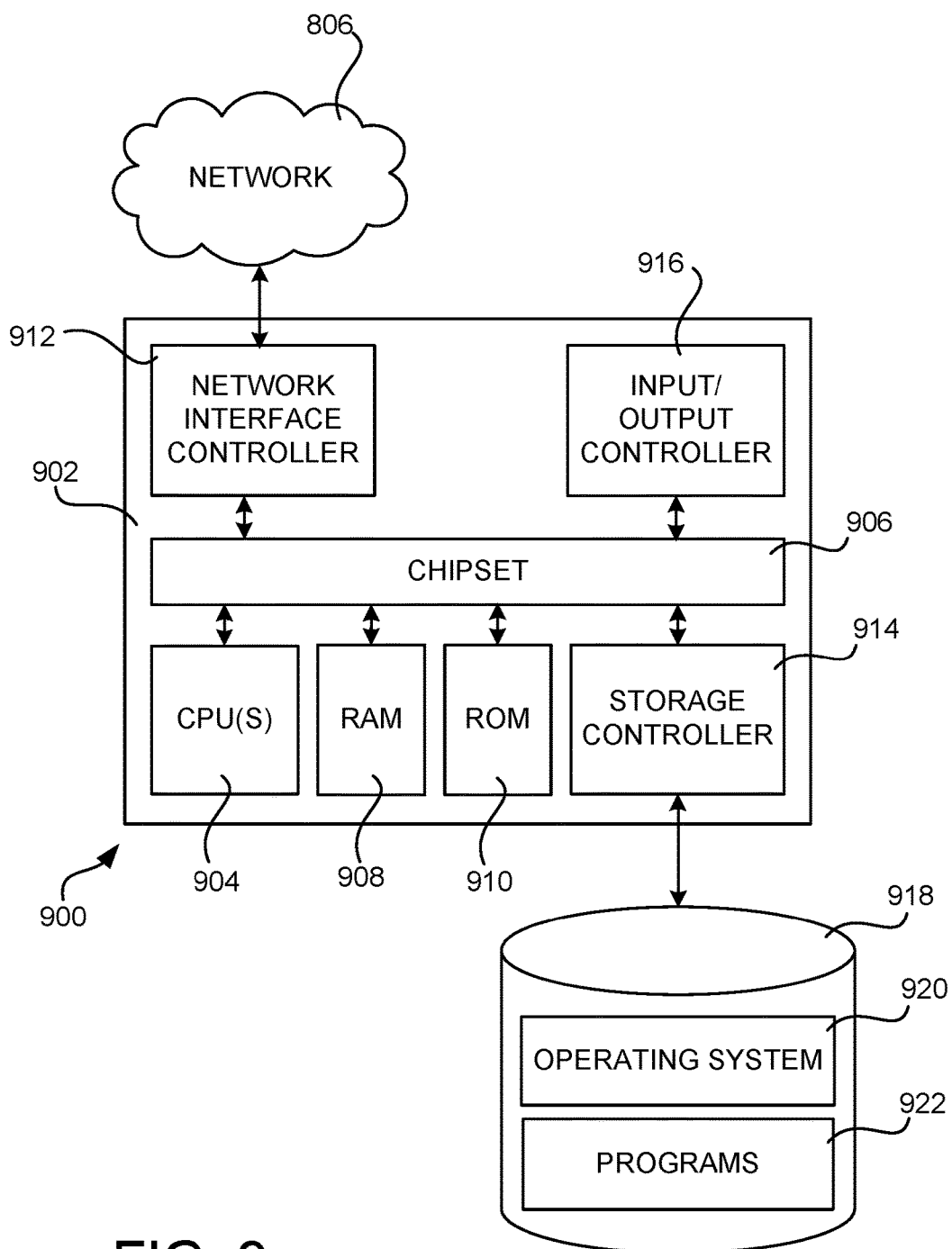
FIG. 9 is a computer architecture diagram showing an illustrative computer hardware architecture for implementing a computing device that can be utilized to implement aspects of the various technologies presented herein.

FIG. 9 shows an example computer architecture for a computer 900 capable of executing program components for implementing various aspects of the functionality described herein. The computer architecture shown in FIG. 9 illustrates a conventional server computer, workstation, desktop computer, laptop, tablet, network appliance, e-reader, smartphone, or other computing device, and can be utilized to execute any of the software components presented herein. For example, the computer architecture shown in FIG. 9 can be utilized to execute software components for providing a development host 100 in the service provider network 102, for providing the computing resources 106, and for providing the related functionality described herein. The computer architecture shown in FIG. 9 can also be utilized to implement a development host 100 in hardware (e.g. a laptop or desktop computer configured in the manner described above).

The computer 900 includes a baseboard 902, or "motherboard," which is a printed circuit board to which a multitude of components or devices can be connected by way of a system bus or other electrical communication paths. In one illustrative embodiment, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the embodiments described herein.

The computer 900 can operate in a networked environment using logical connections to remote computing devices and computer systems through a network, such as the network 906. The chipset 906 can include functionality for providing network connectivity through a NIC 912, such as a gigabit Ethernet adapter. The NIC 912 is capable of connecting the computer 900 to other computing devices over the network 806. It should be appreciated that multiple NICs 912 can be present in the computer 900, connecting the computer to other types of networks and remote computer systems.

The computer 900 can be connected to a mass storage device 918 that provides non-volatile storage for the computer. The mass storage device 918 can store an operating system 920, programs 922, and data, which have been described in greater detail herein. The mass storage device 918 can be connected to the computer 900 through a storage controller 914 connected to the chipset 906. The mass storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the mass storage device 918 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 918 is characterized as primary or secondary storage, and the like.

For example, the computer 900 can store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the mass storage device 918 by detecting the physical states or characteristics of one or more particular locations within the physical storage units.

In addition to the mass storage device 918 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 918 can store an operating system 920 utilized to control the operation of the computer 900. In one embodiment, the operating system 920 is the LINUX operating system. In another embodiment, the operating system 920 is the WINDOWS SERVER operating system from MICROSOFT CORPORATION. In other embodiments, the UNIX operating system or one of its variants can be utilized as the operating system 920. It should be appreciated that other operating systems can also be utilized. The mass storage device 918 can store other system or application programs and data utilized by the computer 900.

In one embodiment, the mass storage device 918 or other computer-readable storage media is encoded with computer-executable instructions which, when loaded into the computer 900 and executed, transform the computer from a general-purpose computing system into a special-purpose computer capable of implementing the embodiments described herein. These computer-executable instructions transform the computer 900 by specifying how the CPUs 904 transition between states, as described above. According to one embodiment, the computer 900 has access to computer-readable storage media storing computer-executable instructions which, when executed by the computer 900, perform the various processes described herein. The computer 900 can also include computer-readable storage media for performing any of the other computer-implemented operations described herein.

The computer 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or might utilize an architecture completely different than that shown in FIG. 9.

It should be appreciated that technologies for providing a rapid software development environment have been disclosed herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example embodiments and applications illustrated and described, and without departing from the true spirit and scope of the present invention, which is set forth in the following claims.

What is claimed is:

1. An apparatus, comprising:
at least one non-transitory computer-readable storage medium to store instructions which, in response to being performed by one or more processors, cause the apparatus to:
receive an application stack definition that defines requirements of an instantiation of an application stack;
receive a workflow definition that defines a process for application development, the process used to iterate on software code changes;
based at least in part on the application stack definition, create a first instance of the application stack for an application on a development host, the first instance of the application stack comprising at least:
a partial replica of a production application stack for the application in a service provider network;
a first software container for executing the application;
a second software container for executing a second application, the second application of a different type than the application; and
a third software container for executing at least one network service;
based at least in part on the workflow definition, cause a second instance of a workflow to be executed on the development host, the second instance of the workflow configured to automate a development workflow for the application using the first instance of the application stack, wherein at least a first portion of the development workflow is performed with respect to at least the application, and wherein at least a second portion of the development workflow is performed with respect to at least the second application; and
cause network requests generated by the application directed toward a network service operating in the service provider network to be redirected to the at least one network service executing in the third software container.

2. The apparatus of claim 1, wherein the development workflow comprises causing one or more computing resources upon which execution of the application is dependent to be provisioned in the service provider network.

3. The apparatus of claim 1, wherein the development workflow comprises:
causing the application to be built;
causing one or more unit tests to be performed on the application;
causing execution of the first instance of the application stack to be started;
causing the application to be deployed to the first instance of the application stack;
causing integration tests to be performed on the application;
causing one or more computing resources in the service provider network to be de provisioned;
executing a user-defined step;
stopping the execution of the first instance of the application stack; or
causing a code review for the application to be initiated.

4. The apparatus of claim 1, wherein the service provider network comprises at least one of a virtual machine instance, a data storage resource, database resource, or a networking resource.

5. The apparatus of claim 1, wherein the first instance of the application stack is associated with a first user and the at least one non-transitory computer-readable storage medium to store further instructions which, in response to being performed by one or more processors, cause the apparatus to: share the application stack definition; and based at least in part on sharing the application stack definition, cause a third instance of the application stack for the application to be created, the third instance of the application stack different from the first instance of the application stack and associated with a second user.

6. The apparatus of claim 1, wherein the production application stack executes in the service provider network and wherein the first instance of the application stack and the second instance of the workflow execute on the development host.

7. The apparatus of claim 1, wherein the at least one non-transitory computer-readable storage medium to store further instructions which, in response to being performed by one or more processors, cause the apparatus to: share the workflow definition to cause a third instance of a second workflow to be executed.

8. A processor comprising:
a decoder to decode instructions to:
receive an application stack definition that defines requirements of an instantiation of an application stack;
receive a workflow definition that defines a process for application development; the process used to iterate on software code changes;
based at least in part on the application stack definition, cause a first instance of the application stack for an application to be created on a development host, the first instance of the application stack comprising at least:
a partial replica of a production application stack for the application in a service provider network;
a first software container for executing the application;
a second software container for executing a second application, the second application of a different type than the application; and
a third software container for executing at least one network service;
based at least in part on the workflow definition, cause a second instance of a workflow to be executed on the development host, the second instance of the workflow configured to automate a development workflow for the application using the first instance of the application stack, wherein at least a first portion of the development workflow is performed with respect to at least the application, and wherein at least a second portion of the development workflow is performed with respect to at least the second application; and
cause network requests generated by the application directed toward a network service operating in the service provider network to be redirected to the at least one network service executing in the third software container.

9. The processor of claim 8, wherein the first instance of the application stack is associated with a first user and the decoder decodes instructions to further: share the application stack definition; and based at least in part on sharing the application stack definition, cause a third instance of the application stack for the application to be created, the third instance of the application stack different from the first instance of the application stack and associated with a second user.

10. The processor of claim 8, wherein the production application stack executes in the service provider network and wherein the first instance of the application stack and the second instance of the workflow execute on the development host.

11. The processor of claim 8, wherein the decoder decodes instructions to further: share the workflow definition to cause a third instance of a second workflow to be executed.

12. The processor of claim 8, wherein the service provider network comprises at least one of a virtual machine instance, a data storage resource, database resource, or a networking resource.

13. The processor of claim 8, wherein at least a portion of the development workflow comprises:
causing the application to be built;
causing one or more unit tests to be performed on the application;
causing execution of the first instance of the application stack to be started;
causing the application to be deployed to the first instance of the application stack;
causing integration tests to be performed on the application;
causing one or more computing resources in the service provider network to be provisioned;
causing one or more computing resources in the service provider network to be de-provisioned;
executing a user-defined step;
stopping execution of the first instance of the application stack; or
causing a code review for the application to be initiated.

14. The processor of claim 8, wherein the development workflow comprises causing one or more computing resources upon which execution of the application is dependent to be provisioned in the service provider network.

15. A computer-implemented method, comprising:
receiving an application stack definition that defines requirements of an instantiation of an application stack;
receiving a workflow definition that defines a process for application development, the process used to iterate on software code changes;
creating, based at least in part on the application stack definition, a first instance of the application stack for an application on a development host, the first instance of the application stack comprising at least:
a partial replica of a production application stack for the application in a service provider network;
a first software container for executing the application;
a second software container for executing a second application, the second application of a different type than the application; and
a third software container for executing at least one network service;
creating, based at least in part on the workflow definition, a second instance of a workflow on the development host, the second instance of the workflow configured to automate a development workflow for the application using the first instance of the application stack, wherein at least a first portion of the development workflow is performed with respect to at least the application, and wherein at least a second portion of the development workflow is performed with respect to at least the second application; and
causing network requests generated by the application directed toward a network service operating in the service provider network to be redirected to the at least one network service executing in the third software container.

16. The computer-implemented method of claim 15, wherein the service provider network comprises at least one of a virtual machine instance, a data storage resource, database resource, or a networking resource.

17. The computer-implemented method of claim 16, wherein at least a portion of the development workflow comprises:

causing the application to be built;
causing one or more unit tests to be performed on the application;
causing execution of the first instance of the application stack to be started;
causing the application to be deployed to the first instance of the application stack;
causing integration tests to be performed on the application;
causing one or more computing resources in the service provider network to be provisioned;
causing one or more computing resources in the service provider network to be de-provisioned;
executing a user-defined step;
stopping execution of the first instance of the application stack; or
causing a code review for the application to be initiated.

18. The computer-implemented method of claim 15, further comprising: sharing the application stack definition, wherein the first instance of the application stack is associated with a first user; and based at least in part on sharing the application stack definition, causing a third instance of the application stack for the application to be created, the third instance of the application stack different from the first instance of the application stack and associated with a second user.

19. The computer-implemented method of claim 15, wherein the production application stack executes in the service provider network and wherein the first instance of the application stack and the second instance of the workflow execute on the development host.

20. The computer-implemented method of claim 15, further comprising: sharing the workflow definition to cause a third instance of a second workflow to be executed.

* * * * *